United States Patent [19]
Tamer et al.

[11] 3,892,527
[45] July 1, 1975

[54] PROCESS FOR LOWERING THE DYESTUFF AFFINITY OF FIBRE MATERIALS MADE OF POLYACRYLONITRILE

[75] Inventors: Ergun Tamer, Bergisch, Neukirchen; Udo Hendricks, Cologne; Mathieu Quaedvlieg, Opladen, all of Germany

[73] Assignee: Bayer Aktiengesellschaft, Leverkusen-Bayerwerk, Germany

[22] Filed: Feb. 16, 1970

[21] Appl. No.: 11,917

[30] Foreign Application Priority Data
May 31, 1969 Germany............................ 1927920

[52] U.S. Cl..................................... 8/172; 8/177 R
[51] Int. Cl................................................ D06p 5/06
[58] Field of Search .......................... 8/172, 177 AB

[56] References Cited
UNITED STATES PATENTS

| | | | |
|---|---|---|---|
| 2,899,262 | 8/1959 | Stanton................................... | 8/172 |
| 2,984,539 | 5/1961 | Matter.................................... | 8/172 |
| 3,078,242 | 2/1963 | Morgan............................ | 8/100 UX |
| 3,104,934 | 9/1963 | Blumekopf.............................. | 8/172 |

FOREIGN PATENTS OR APPLICATIONS

1,105,193    3/1968    United Kingdom ............. 8/177 AB

OTHER PUBLICATIONS
American Dyestuff Reporter, 1963, pages 182–183

Abstract of article by Meldrum et al.
Kellet, J. Soc. Dyers & Colourists, May, 1968, No. 5, pages 257–261. TP89056.

Primary Examiner—Donald Levy
Attorney, Agent, or Firm—Plumley & Tyner

[57] ABSTRACT

Process for lowering the dyestuff affinity of fibre materials manufactured from polyacrylonitrile of copolymers containing acrylonitrile consisting in treating or printing the fibre materials before dyeing with aqueous baths respectively aqueous pastes which contain water-soluble polyamides which have been obtained by reaction of aliphatic polyamines of formula

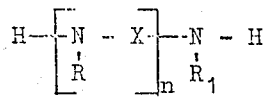

wherein R and $R_1$ independently of one another represent hydrogen, a $C_1 - C_5$-alkyl group or a hydroxyalkyl group with 1 – 3 C-atoms, X denotes a divalent optionally substituted aliphatic residue with 1 – 6 C-atoms and n represents an integer from 1 – 4, with α, β-unsaturated aliphatic monocarboxylic acids or aliphatic polycarboxylic acids which optionally contain heteroatoms.

8 Claims, No Drawings

PROCESS FOR LOWERING THE DYESTUFF AFFINITY OF FIBRE MATERIALS MADE OF POLYACRYLONITRILE

The present invention relates to a process for lowering the dyestuff affinity of fibre materials manufactured from polyacrylonitrile or copolymers containing acrylonitrile; more particularly it concerns a process for lowering the dyestuff affinity of fibre materials manufactured from polyacrylonitrile or copolymers containing acrylonitrile, wherein, the fibre materials, before dyeing, are treated with aqueous baths or printed with aqueous printing pastes which contain water-soluble polyamides which have been obtained by reaction of aliphatic polyamines of formula

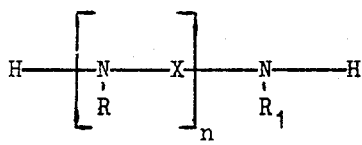

in which

R and $R_1$ independently of one another represent hydrogen, a $C_1 - C_5$ alkyl group or a hydroxyalkyl group with 1 – 3 C atoms, X denotes a divalent optionally substituted aliphatic residue with 1 – 6 C atoms, and n represents an integer from 1 – 4, with $\alpha, \beta$-unsaturated aliphatic monocarboxylic acids or aliphatic polycarboxylic acids which optionally contain heteroatoms, or with their functional derivatives which are capable of amide formation, for example halides, amides, anhydrides or esters.

As amines of general formula I which are suitable for the manufacture of the water-soluble polyamides to be used according to the invention, there may for example be mentioned: ethylenediamine, diethylenetriamine, triethylenetetramine, tetraethylenepentamine, bis-(3-amino-propyl)-amine, tripropylenetetramine, N-(2-hydroxyethyl)-ethylenediamine, hexamethylenediamine, N,N'-dimethylethylenediamine and especially polyamines containing tertiary aminogroups such as bis-(3-aminopropyl)-methylamine.

As $\alpha,\beta$-unsaturated carboxylic acids, acrylic acid and methacrylic acid may be mentioned, and as aliphatic polycarboxylic acids optionally containing heteroatoms, succinic acid, adipic acid, maleic acid and diglycollic acid may be mentioned.

The water-soluble polyamides to be used according to the invention are known. They can for example be obtained by reaction of amines of formula I with $\alpha,\beta$-unsaturated carboxylic acids or aliphatic polycarboxylic acids optionally containing hetero atoms or their funtional derivatives which are capable of amide formation, at temperatures about 40°C, optionally under reduced pressure.

The most favourable quantity ratios between the amines of formula I on the one hand and the $\alpha,\beta$-unsaturated carboxylic acids or aliphatic polycarboxylic acids optionally containing hetero-atoms, or their functional derivatives capable of amide formation, on the other, can be easily determined by preliminary experiments. It has proved particularly successful to employ amines and carboxylic acids in such a quantity ratio that there are 0.5-3, preferably 0.75-1.5, primary and-/or secondary amino groups for each double bond and each carboxyl group or its functional derivatives.

The water-soluble polyamides to be used according to the invention advantageously possess an average molecular weight of 400-2000. Polyamides which still possess free primary or secondary amino groups can, before use, be brought to a pH-value of 4–7 by means of acids appropriately by means of lower aliphatic carboxylic acids, such as formic acid, acetic acid or glycollic acid.

The amounts of the substances to be used according to the invention which are added to the pretreatment baths can vary within wide limits. In general an addition of 0.005–0.5%, preferably 0.05–0.25% by weight relative to the weight of the fibre material has proved successful.

The pretreatment of the fibre material is appropriately carried out by introducing the material into an aqueous liquor, warmed to about 40°C, which contains the water-soluble polyamides to be used according to the invention, subsequently raising the temperature of the treatment bath over the course of about 30 minutes to 90°–100°C and leaving the bath for 15–30 minutes at the temperature. Thereafter the temperature of the liquor is gradually lowered to about 50°C by running in cold water. After brief rinsing with cold water the material is freed of water and dried.

Another embodiment of the process according to the invention consists of printing the polyacrylonitrile fibre materials with aqueous pastes which contain the polyamides to be used according to the invention and optionally also wetting agents and thickness, and subsequently steaming for 5 to 10 minutes at about 100°C.

Suitable copolymers containing acrylonitrile are, for example, those of acrylonitrile and vinyl chloride, vinylidene chloride, vinyl acetate, vinyl chloracetate, vinyl alcohol, acrylic and methacrylic acid, acrylic and methacrylic acid esters, allyl chloracetate or basic vinyl compounds, such as vinylimidazole, vinylbenzimidazole, vinylpyridine, vinylmethylpyridine and vinylpyrimidine, provided the proportion of the comonomer is not more than 20% by weight. The fibre materials can be present in any processing state, for example as tow, filaments, flock, combed tops, yarn, woven fabric or knitted fabric.

The water-soluble polyamides to be used according to the invention significantly lower the dyestuff affinity of the polyacrylonitrile fibre materials towards cationic dyestuffs. The cationic dyestuffs can belong to the most diverse groups, for example to the diphenylmethane, triphenylmethane or rhodamine dyestuffs, the azo or anthraquinone dyestuffs containing onium groups, and the triazine, oxazine, methine or azomethine dyestuffs.

The process according to the invention is of particular importance for the production of differences in depth of colour when dyeing or printing fibre materials made of polyacrylonitrile. This is because, if fibre materials pretreated according to the invention are dyed together with untreated polyacrylonitrile fibre materials by a continuous or discontinuous procedure, contrast-rich bicolour dyeings are obtained, since the pretreated fibre material shows a significantly lighter dyeing than the non-pretreated fibre material. Since the treatment according to the invention, simultaneously with achieving the lowering of the dyestuff affinity towards cationic dyestuffs, achieves good dye receptivity of the polyacrylonitrile fibre materials towards anionic dyestuffs, such as are usually employed for dyeing natural and synthetic polyamide fibres, it is possible to achieve multicolour effects by the conjoint use of anionic dyestuffs alongside cationic dyestuffs in the padding liquors or dyebaths. Very attractive multicolour effects can also be achieved by the conjoint use of dispersion dyestuffs when dyeing polyacrylic fibre materials pretreated according to the invention and untreated polyacrylic fibre materials with cationic dyestuffs, since the dispersion dyestuffs, the absorption of which is not influenced by the pretreatment, effect a significantly greater displacement in colour shade on the pretreated lightly dyed fibre material than on the non-pretreated heavily dyed fibre material.

The structures of the dyestuffs designated by numbers I – VI are listed on the Table found at the end of the Examples.

EXAMPLE 1

Polyacrylonitrile yarn is treated in a yarn dyeing apparatus, using a liquor ratio of 1:30, with a liquor which per litre contains 0.03 g of the 1:1 condensation product of bis-(3-amino-propyl)-methylamine and acrylic acid methyl ester described below. The bath is warmed from 40°C to 100°C over the course of 30 minutes and is subsequently kept at this temperature for 15 minutes After brief rinsing, the yarn is freed of water and dried.

This pretreated yarn is converted, together with non-pretreated polyacrylonitrile yarn, into a carpet which is dyed in the usual manner on a winch, using a liquor ratio of 1:40, with a liquor which per litre contains 0.3 g of dyestuff I
0.2 g of glacial acetic acid
0.25 g of sodium acetate and
0.3 g of cetyldimethylbenzylammonium chloride.

A very contrast-rich, luminous light red-dark red dyeing is obtained, since the pretreated yarn shows a significantly lighter red dyeing than the non-pretreated yarn.

The 1:1 condensation product used for the pretreatment had been manufactured as follows:

290 parts by weight of bis-(3-amino-propyl)-methylamine were mixed at 40°–50°C with 172 parts by weight of acrylic acid methyl ester and subsequently fed in a vacuum of 12 mm Hg, initially for 2 hours at 90°–100°C and then for 1 hour at 150°–160°C. A highly viscous substance was obtained which dissolved in water to give a clear solution and had an average molecular weight of 2400.

An equivalent lowering of the dyestuff affinity was achieved when instead of the described 1:1-condensation product the same amount of the 1:2-condensation product of bis-(3-aminopropyl)-methylamine and acrylic acid methyl ester described below was used.

This 1:2-condensation product was prepared as follows:

290 Parts by weight triethylene-tetramine were mixed at 40°–50°C with 344 parts by weight acrylic acid methyl ester. The mixture was stirred at 80°–90°C for one hour and subsequently heated for 1,5 hours in a water jet vacuum at 150°–160°C. The water-soluble condensation product had an average molecular weight of 700.

EXAMPLE 2

Knitting yarn made of polyacrylonitrile is treated in a yarn dyeing apparatus, in a liquor ratio of 1:30, with a liquor which per litre contains 0.06 g of the 1:1 condensation product of triethylenetetramine and acrylic acid methyl ester described below. The bath is warmed from 40°C to 100°C over the course of 30 minutes and subsequently kept at this temperature for 15 minutes. After brief rinsing the yarn is freed of water and dried.

The yarn pretreated in this way is knitted together with non-pretreated yarn. These knitted goods are dyed in the usual manner, using a liquor ratio of 1:30, with a liquor which per litre contains 0.25 g of the dyestuff II
0.2 g of glacial acetic acid
0.33 g of sodium acetate
0.33 g of cetyldimethylbenzylammonium chloride.

A very contrast-rich reddish violet light-dark dyeing is obtained since the pretreated yarn shows a significantly lighter reddish violet dyeing than the non-pretreated yarn.

The 1:1 condensation product used for the pretreatment had been manufactured as follows:

292 parts by weight of triethylenetetramine were mixed at 40°–50°C with 172 parts by weight of acrylic acid methyl ester and subsequently heated for 3 hours at 150°–160°C in a waterpump vacuum. A water-soluble condensate having an average molecular weight of 500 was obtained.

An equivalent lowering of the dyestuff affinity was achieved when instead of the described 1:1-condensation product the same amount of one of the 1:2-condensation products described below was used.

1:2-condensation product of triethylene-tetramine and acrylic acid methyl ester. It was prepared as follows:

175 Parts by weight of triethylene-tetramine were mixed at 40°–50°C with 206 parts by weight of acrylic acid methyl ester. The mixture was stirred for 1 hour at 80°–90°C and subsequently heated for 75 minutes in a water jet vaccum at 150°–155°C. There was obtained a water-soluble condensation product of an average molecular weight of 1500.

1:1-condensation product of diethylene-triamine and acrylic acid methyl ester. It was prepared as follows:

103 Parts by weight of diethylene-triamine were mixed at 40°–50°C with 172 parts by weight of acrylic acid methyl ester. The mixture was subsequently heated for 2 hours in a water jet vacuum at 150°–160°C. There was obtained a water-soluble condensation product of an average molecular weight of 1100.

EXAMPLE 3

The procedure described in example 2 is followed. However, instead of the product used in example 2, the pretreatment bath contains, per litre, 0.16 g of the 1:1 condensation product of ethylenediamine and acrylic acid methyl ester described below. This 1:1 condensation product had been manufactured as follows:

240 parts by weight of ethylenediamine were mixed at 50°–60°C with 344 parts by weight of acrylic acid methyl ester and stirred for 1 hour at the same temperature. Thereafter the mixture was heated for 3 hours to 150°–160°C in a water-pump vacuum. A reddish water-soluble condensate having an average molecular weight of 1000 was obtained.

On dyeing a material consisting of the pretreated and non-pretreated yarn, a contrast-rich light-dark dyeing is obtained on the material.

When instead of the 1:1-condensation product there was used the same amount of a 1:2-condensation product of pentaethylenehexamine and methacrylic acid methyl ester there was achieved an equivalent lowering of the dyestuff affinity.

The 1:2-condensation product was prepared as follows:

116 Parts by weight of pentaethylene-hexamine were mixed with 100 parts by weight of methacrylic acid methyl ester. The mixture was stirred for one hour at 80°–90°C and was subsequently heated for 1.5 hours in a water jet vacuum at 140°–150°C. There was obtained a water-soluble condensation product of an average molecular weight of 630.

EXAMPLE 4

Knitted goods made of polyacrylonitrile yarn are printed with a printing paste which per kilogram contains 5 g of the 1:1 condensation product of N-(2- hydroxyethyl)-ethylenediamine and acrylic acid, described below, 10 g of the polyglycol ether of formula

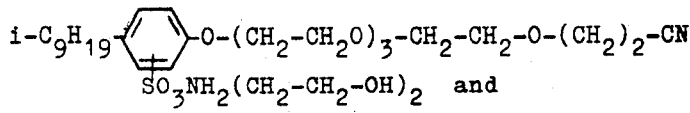

and 300 g of a 3.5% strength aqueous solution of a commercially available carob bean flour derivative, and the goods are subsequently steamed for 5–10 minutes at 100°C without drying. After brief washing and drying the knitted goods are unravelled and the yarn thus obtained is worked into a carpet.

This carpet is dyed in the usual manner on a winch, using a liquor ratio of 1:40, with a liquor which per litre contains 0.5 g of dyestuff No. III
0.2 g of glacial acetic acid
0.25 g of sodium acetate and
0.3 g of cetyldimethylbenzylammonium chloride.

A very contrast-rich light blue-dark blue dyeing is obtained since the printed areas shown a significantly lighter blue dyeing than the non-printed areas.

The 1:1 condensation product used for the printing had been manufactured as follows:

208 parts by weight of N-(2-hydroxyethyl)-ethylenediamine were mixed at 50–60°C with 144 parts by weight of acrylic acid. The reaction mixture was stirred for 3 hours at the same temperature, then heated for 2 hours to 140°C and for 4 hours to 170°–180 C, and subsequently kept for a further 1.5 hours at the same temperature under a vacuum of 12 mmHg. A greenish-brown viscous substance having an average molecular weight of 400 was obtained.

EXAMPLE 5

Polyacrylonitrile yarn is printed with a printing paste which per kilogram contains 2 g of the 1:1 condensation product of diethylene-triamine and succinic acid dimethyl ester, described below, 5 g of the polyglycol ether of formula

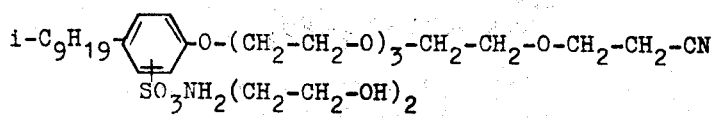

and 300 g of a 3.5% strength solution of a commercially available carob bean flour derivative, and is subsequently steamed, without drying, for 5–10 minutes at 100°C. After brief washing and drying, this yarn is worked into a carpet. This carpet is continuously dyed in the usual manner with 5 g of dyestuff IV per litre of padding liquor (liquor uptake: 300%) and subsequently steamed for 10 minutes at 100°C. A very contrast-rich light-dark effect is obtained, since the printed areas shown a significantly lighter blue dyeing than the non-printed areas.

The 1:1 condensation product used for the printing had been manufactured as follows:

103 parts by weight of diethylenetriamine, 146 parts by weight of succinic acid dimethyl ester and 0.5 parts by weight of potassium hydroxide were heated for 1 hour to 150°–160°C, thereafter the pressure was lowered to about 15 mm Hg, and the mixture was kept for a further hour at the same temperature. A water-soluble condensate having an average molecular weight of 500 was obtained.

EXAMPLE 6

Polyacrylonitrile yarn is treated in a yarn dyeing apparatus, using a liquor ratio of 1:30, with a liquor which per litre contains 0.16 g of the condensation product of diethylenetriamine and acrylamide described below. The bath is warmed from 40°to 100°C over the course of 30 minutes and kept at the boil for 15 minutes. After brief rinsing the yarn is freed of water and dried. This yarn, together with a non-pretreated polyacrylonitrile yarn, is worked into a carpet.

This carpet is dyed in the usual manner, on a continuous carpet dyeing installation, with 7 g of dyestuff V per litre of padding liquor (liquor uptake: 300%). A very contrast-rich light green-dark green dyeing is obtained, since the pretreated yarn shows a significantly lighter dyeing than the non-pretreated yarn.

The 1:1 condensation product used for the pretreatment had been manufactured as follows:

206 parts by weight of diethylenetriamine were mixed at 40–50°C with 142 parts by weight of acrylamide. The reaction mixture was stirred for 1 hour at the same temperature and after addition of 3.5 parts by weight of potassium hydroxide was heated for 3 hours to 190°–200°C and subsequently for 2 hours, under a vacuum of 12 mm Hg, to 190°–200°C. A greenish-coloured highly viscous liquid having an average molecular weight of 350 was obtained.

EXAMPLE 7

A carpet made of polyacrylonitrile is printed on a film printing machine with a printing paste which per kilogram contains 5 g of the 1:1 condensation product as described in example 1
20 g of the polyglycol ether of formula

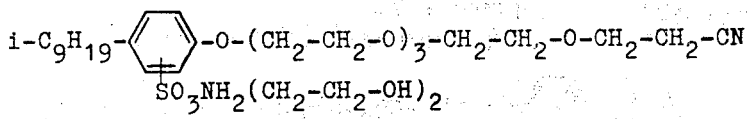

and 400 g of a 3.5% strength solution of a commercially available carob bean flour derivative,
and is subsequently steamed for 5–10 minutes.

Thereafter the carpet is dyed in the usual manner on a winch, using a liquor ratio of 1:40, with a liquor which per litre contains 0.25 g of dyestuff No. VI
0.2 g of glacial acetic acid
0.25 g of sodium acetate and
0.3 g of cetyldimethylbenzylammonium chloride.

A very contrast-rich print is obtained, since the printed areas show a significantly lighter violet dyeing than the non-printed areas.

Structures of dyestuffs I used in the Examples

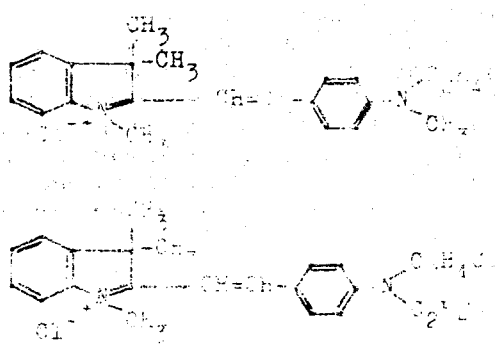

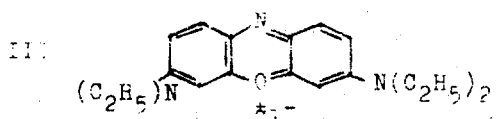

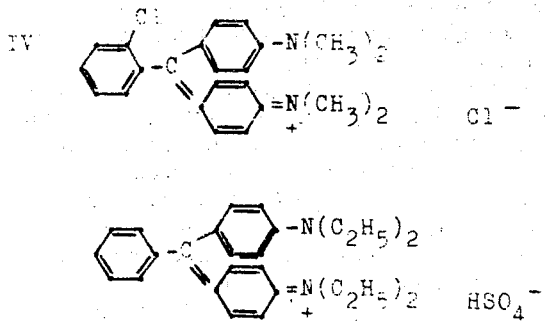

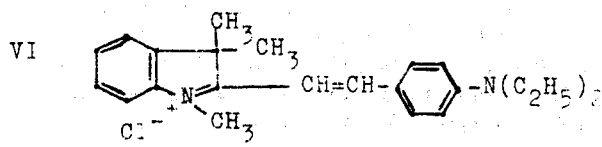

We claim:

1. Process for lowering the dyestuff affinity of polyacrylonitrile or polyacrylonitrile copolymer fiber materials comprising the step of treating said fiber materials before dyeing with an aqueous composition containing a water-soluble polyamide obtained by the reaction of
   A. an aliphatic polyamine of the formula

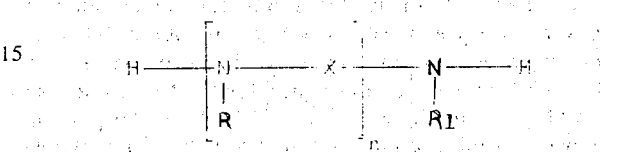

in which
   R and $R_1$ independently of one another are hydrogen, alkyl of 1 to 5 carbon atoms or hydroxyalkyl of 1 to 3 carbon atoms;
   X is an alkylene radical of 1 to 6 carbon atoms; and
   $n$ is an integer from 1 to 4; with
   B. $\alpha,\beta$-unsaturated aliphatic monocarboxylic acid, aliphatic polycarboxylic acid, or a functional derivative of said acids capable of amide formation said functional derivative selected from the group consisting of acid halides, amides, anhydrides, and esters.

2. The process of claim 1 in which the ratio of A to B is such that 0.5 to 3 primary or secondary amino groups are present in A for every double bond, carboxyl group, or functional derivative of a carboxyl group capable of amide formation in B.

3. The process of claim 1 in which the ratio of A to B is such that 0.75 to 1.5 primary or secondary amino groups are present in A for every double bond, carboxyl group, or functional derivative of a carboxyl group capable of amide formation in B.

4. The process of claim 1 in which the amine A is selected from the group consisting of ethylenediamine, diethylenetriamine, triethylenetetramine, tetraethylenepentamine, bis-(3-amino-propyl)-amine, tripropylenetetramine, N-(2hydroxyethyl)-ethylenediamine, hexamethylenediamine, N,N'-dimethylethylenediamine and bis-(3-aminopropyl)-methylamine; and the B is selected from the group consisting of acrylic acid, methacrylic acid, succinic acid, adipic acid, maleic acid, diglycollic acid and functional derivatives thereof capable of amide formation.

5. The process of claim 1 in which said amine is a tertiary amine.

6. The process of claim 1 in which said amine A is bis-(3-aminopropyl)-methylamine).

7. The fiber material treated by the process of claim 1.

8. The process of claim 1 in which said water-soluble polyamide has a molecular weight of 400–2000.

* * * * *